(12) United States Patent
Hersche et al.

(10) Patent No.: US 9,170,702 B2
(45) Date of Patent: Oct. 27, 2015

(54) MANAGEMENT SYSTEM USER INTERFACE IN A BUILDING AUTOMATION SYSTEM

(75) Inventors: Andreas Hersche, Island Lake, IL (US); Dario Incorvaia, Monza (IT)

(73) Assignee: Siemens Schweiz AG, Zurich (CH)

( * ) Notice: Subject to any disclaimer, the term of this patent is extended or adjusted under 35 U.S.C. 154(b) by 346 days.

(21) Appl. No.: 13/538,182

(22) Filed: Jun. 29, 2012

(65) Prior Publication Data

US 2013/0086152 A1    Apr. 4, 2013

Related U.S. Application Data

(63) Continuation-in-part of application No. PCT/US2011/054141, filed on Sep. 30, 2011.

(60) Provisional application No. 61/541,925, filed on Sep. 30, 2011.

(51) Int. Cl.
| | | |
|---|---|---|
| *G06F 15/16* | (2006.01) | |
| *G06F 3/048* | (2013.01) | |
| *G05B 15/02* | (2006.01) | |
| *G05B 23/02* | (2006.01) | |

(52) U.S. Cl.
CPC .............. *G06F 3/048* (2013.01); *G05B 15/02* (2013.01); *G05B 23/0272* (2013.01); *G05B 2219/2642* (2013.01)

(58) Field of Classification Search
CPC ....................................................... G06F 3/084
USPC .................................. 709/203, 220, 244, 249
See application file for complete search history.

(56) References Cited

U.S. PATENT DOCUMENTS

| | | | | |
|---|---|---|---|---|
| 6,272,537 | B1* | 8/2001 | Kekic et al. ................... | 709/223 |
| 8,132,101 | B2* | 3/2012 | Buck et al. .................... | 715/708 |
| 2007/0282993 | A1* | 12/2007 | McMillan et al. ............. | 709/223 |
| 2009/0210071 | A1 | 8/2009 | Agrusa et al. | |
| 2009/0281677 | A1* | 11/2009 | Botich et al. .................. | 700/295 |

FOREIGN PATENT DOCUMENTS

EP          1515289 A1      3/2005

OTHER PUBLICATIONS

PCT Search Report mailed Mar. 13, 2013, for Application No. PCT/US2012/057240.

* cited by examiner

*Primary Examiner* — Ario Etienne
*Assistant Examiner* — Sahera Halim

(57) ABSTRACT

A client manager application for a building management system. A method includes maintaining a client manager application configured to interact with both a web client data processing system and an installed client data processing system to perform building management system functions. The installed client data processing system operates an installed client manager application to provide an installed building management interface. The method includes deploying a browser client manager module to the web client data processing system. A browser building management interface that has substantially the same appearance and functionality as the installed building management interface. The server interacts with both the installed client data processing system and the web client data processing system to perform the building management system functions. The client manager application can be configured to run in a web client data processing system as well as in an installed client data processing system.

17 Claims, 6 Drawing Sheets

MANAGEMENT SYSTEM USER INTERFACE IN A BUILDING AUTOMATION SYSTEM

CROSS-REFERENCE TO OTHER APPLICATIONS

This application claims priority to PCT Application Serial No. PCT/US2011/054141, filed Sep. 30, 2011, entitled "Management System with Versatile Display" and to U.S. Provisional Patent Application Ser. No. 61/541,925, filed Sep. 30, 2011, entitled "Management System Using Function Abstraction for Output Generation", both of which are hereby incorporated by reference. This application also shares some subject matter in common with, but is otherwise unrelated to, the following patent applications, filed concurrently herewith, all of which are incorporated by reference:
- U.S. patent application Ser. No. 13/537,975 for "Graphical Symbol Animation with Evaluations for Building Automation Graphics;
- U.S. patent application Ser. No. 13/538,275 for "Navigation and Filtering with Layers and Depths for Building Automation Graphics";
- U.S. patent application Ser. No. 13/538,073 for "Unified Display of Alarm Configurations Based On Event Enrollment Objects";
- U.S. patent application Ser. No. 13/537,911 for "Automated Discovery and Generation of Hierarchies for Building Automation and Control Network Objects"; and
- U.S. patent application Ser. No. 13/538,242 for "Management System User Interface For Comparative Trend Views".

TECHNICAL FIELD

The present disclosure is directed, in general, to automation systems and, more particularly, to user interfaces for a management system in a building automation system.

BACKGROUND OF THE DISCLOSURE

Building automation systems encompass a wide variety of systems that aid in the monitoring and control of various aspects of building operation. Building automation systems include security systems, fire safety systems, and comfort systems that control environmental parameters such as heating, ventilation, and air conditioning ("HVAC") and lighting. The elements of a building automation system are widely dispersed throughout a facility. For example, an HVAC system may include temperature sensors and ventilation damper controls, as well as other elements that are located in virtually every area of a facility. These building automation systems typically have one or more centralized control stations from which system data may be monitored and various aspects of system operation may be controlled and/or monitored.

To allow for monitoring and control of the dispersed control system elements, building automation systems often employ multi-level communication networks to communicate operational and/or alarm information between operating elements, such as sensors and actuators, and the centralized control station. In this system, several control stations connected via an Ethernet or another type of network may be distributed throughout one or more building locations, each having the ability to monitor and control system operation.

SUMMARY OF THE DISCLOSURE

Various embodiments include systems, methods and mediums. A method includes maintaining a single application framework ("AFW") code base within a data processing system that enables the monitoring and control functions of the building management system. The method includes configuring the AFW code base to run as an installed client manager application, to run as a browser client manager module, and to provide a user interface having substantially the same appearance and functionality regardless of whether it is run as an installed client manager application or run as a browser client manager module. The method includes deploying the browser client manager module over a network in response to a request from a web client data processing system. The method includes configuring the AFW code base to create a user interface that, in the installed client manager application, is segmented into multiple windows and panes and that, in the browser client manager module is segmented into multiple panes within a single window.

Another method includes maintaining, in a server data processing system, a client manager application configured to interact with both a web client data processing system and an installed client data processing system to perform building management system functions. The installed client data processing system operates an installed client manager application to provide an installed building management interface. The method includes deploying a browser client manager module to the web client data processing system over a network in response to a request from the web client data processing system. The browser client manager module is configured to interact with a web browser on the web client data processing system to provide a browser building management interface that has substantially the same appearance and functionality as the installed building management interface. The method includes operating the server data processing system to interact with both the installed client data processing system and the web client data processing system to perform the building management system functions.

The foregoing has outlined rather broadly the features and technical advantages of the present disclosure so that those skilled in the art may better understand the detailed description that follows. Additional features and advantages of the disclosure will be described hereinafter that form the subject of the claims. Those of ordinary skill in the art will appreciate that they may readily use the conceptions and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; and the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Some methods for creating and maintaining a management system in a building automation system that use both an installed client manager application and a browser client manager module running in a web browser involve creating and maintaining an AFW code base for the browser client manager module that is significantly different from the AFW code base for the client manager application. This produces browser client manager modules whose user interface appears significantly different from the user interface of the installed client manager application. In addition, such browser client manager modules have a reduced set of functionalities in comparison to the installed client manager application because of limitations in the programming languages for a web environment.

Various embodiments of the disclosed invention relate to methods for creating and maintaining a building (i.e., facilities) management system that can be monitored and controlled by an installed client data processing system as well as a web client data processing system. A client manager application is created using a single AFW code base that is capable of being compiled and functioning as an installed client manager application as well as a browser client manager module, i.e., as a temporary download in a web browser. The client manager application generates a graphical user interface having substantially the same appearance and functionality regardless of whether the installed client data processing system or the web client data processing system is used to monitor and control the building management system.

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system.

Figure 1:
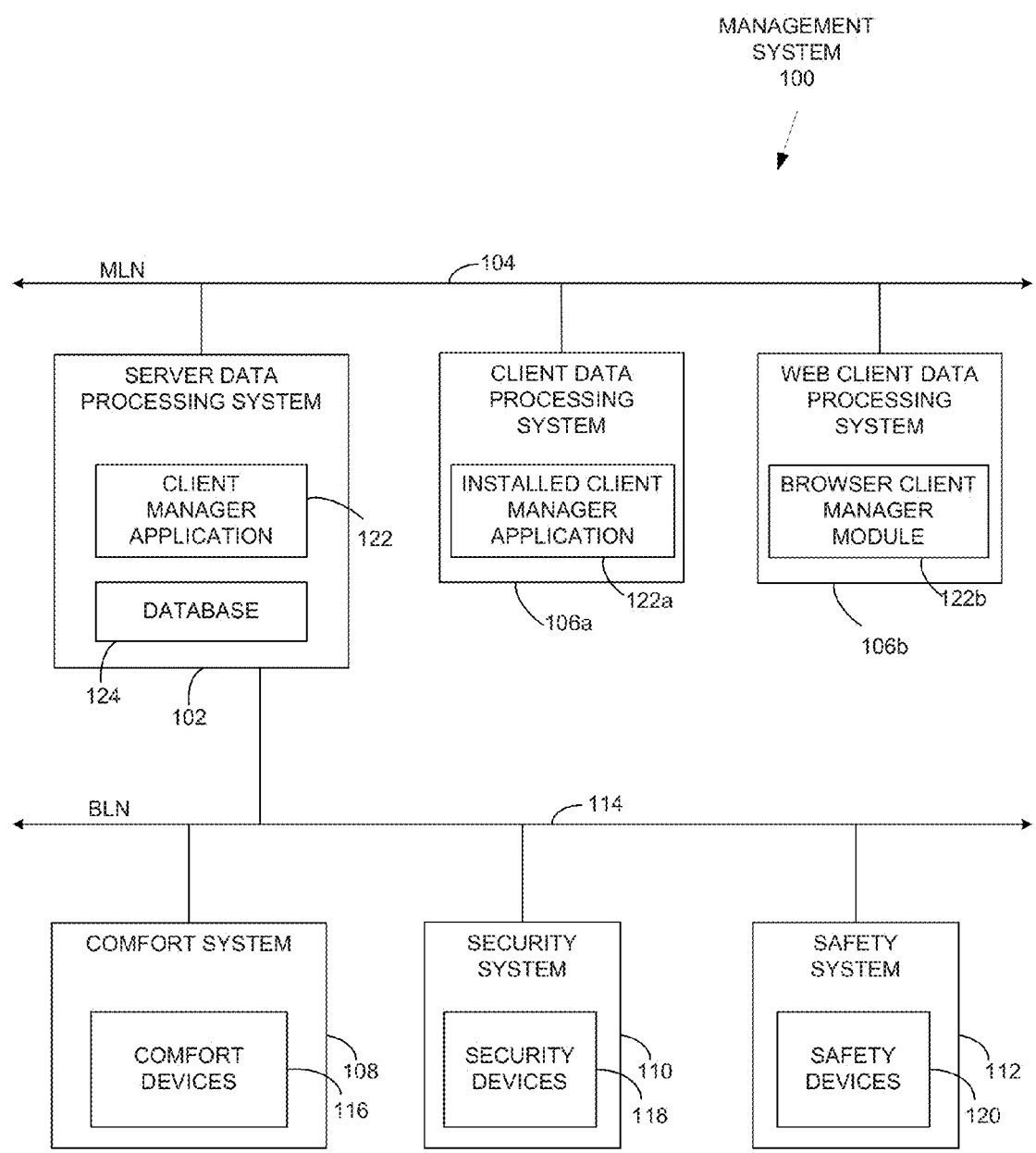
FIG. 1 illustrates a block diagram of a management system in which various embodiments of the present disclosure are implemented.

FIG. 1 illustrates a block diagram of management system 100 in which various embodiments of the present disclosure are implemented. In this illustrative embodiment, the management system 100 includes a server data processing system 102 connected, via a management level network (MLN) 104 to an installed client data processing system 106a and a web client data processing system 106b. The MLN 104 is a medium used to provide communication links between various data processing systems and other devices in the management system 100. MLN 104 may include any number of suitable connections, such as wired, wireless, or fiber optic links. MLN 104 may be implemented as a number of different types of networks, such as, for example, the Internet, a local area network (LAN), or a wide area network (WAN). In some embodiments, elements of the management system 100 may be implemented in a cloud computing environment. For example, MLN 104 may include or be connected to one or more routers, gateways, switches, and/or data processing systems that are remotely located in a cloud computing environment.

In this illustrative embodiment, server data processing system 102 is operably connected to comfort system 108, security system 110, and safety system 112 via building level network (BLN) 114. The comfort system 108 is an environmental control system that controls at least one of a plurality of environmental parameters within a building or buildings, such as, for example, temperature, humidity, and/or lighting. The security system 110 controls elements of security within a building or buildings, such as, for example, location access, monitoring, and intrusion detection. The safety system 112 controls elements of safety within a building or buildings, such as, for example, smoke, fire, and/or toxic gas detection.

As depicted, the comfort system 108 includes comfort devices 116, the security system 110 includes security devices 118, and the safety system 112 includes safety devices 120. The devices 116-120 may be located inside or in proximity to one or more buildings managed using the management system 100. The devices 116-120 are configured to provide, monitor, and/or control functions of the comfort system 108, the security system 110, and/or the safety system 112 within one or more buildings managed using the management system 100. For example, without limitation, the devices 116-120 may include one or more field panels, field controllers, and/or field devices inside or in proximity to one or more buildings. More specifically, devices 116-120 may include one or more general-purpose data processing systems, programmable controllers, routers, switches, sensors, actuators, cameras, lights, digital thermostats, temperature sensors, fans, damper actuators, heaters, chillers, HVAC devices, detectors, motion sensors, glass-break sensors, security alarms, door/window sensors, smoke alarms, fire alarms, gas detectors, etc. The devices 116-120 may use the BLN 114 to exchange information with other components connected to the BLN 114, such as, for example, components within the comfort system 108, the security system 110, the safety system 112, and/or the server data processing system 102. Field devices (such as sensors, actuators, cameras, light devices, heaters, chillers and other HVAC, security and fire safety devices may be connected via a field level network to a field panel or field controller for monitoring and controlling the respective field devices within a room, floor or other space of a building.

Various embodiments of the present disclosure are implemented in the management system 100. The management system 100 allows for systems and devices located throughout one or more buildings to be managed, monitored, and controlled from a single point and in a uniform manner. For example, a client manager application 122 may be installed on a server data processing system 102. The client manager application 122 is a collection of software and associated data files. The client manager application 122 may include, for example, without limitation, executable files, user layout definition files, rules files, graphics control modules, an infrastructure interface, and/or a number of software extensions. The client manager application 122 is a single AFW code base configured to run as an installed client manager application 122a and also configured to run as a browser client manager module 122b. Portions of the client manager application 122 may be installed on an installed client data processing system 106a as well as other devices connected via MLN 104. Portions of the client manager application 122 may be temporarily downloaded or deployed to a web client data processing system 106b at the request of a web client data processing system. The client manager application 122 provides a user-modifiable and intuitive graphical user interface for allowing a user to monitor, review, and control various points and devices in the management system 100. The graphical user interface generated by the client manager application 122 has substantially the same appearance and functionality regardless of whether the client manager application 122 is run as an installed client manager application 122a or run as a browser client manager module 122b. In some embodiments, client manager application 122 may be an application framework as described in PCT Application Serial No. PCT/US2011/054141, entitled "Management System with Versatile Display" and U.S. Provisional Patent Application Ser. No. 61/541,925, entitled "Management System Using Function Abstraction for Output Generation". Both of these applications are hereby incorporated by reference as if fully set forth herein.

The server data processing system 102 includes a database that stores information about the devices 116-120 within the management system 100. A database 124 includes one or more data models of data points, devices, and other objects in the management system 100. For example, the database 124 may store values for devices in the comfort system 108 (e.g., temperature, alarm status, humidity). These values may each be referred to as a point or data point. As referenced herein, a "point" or "data point" may be (i) any physical input or output to or from a respective controller, field device, sensor or actuator, or (ii) any virtual point associated with a control application or logic object within a field controller or field panel of the systems 108-112 that is measured, monitored or controlled. The database 124 may also store static information, such as, model numbers, device types, and/or building and room installation location information about devices in the management system 100. The database 124 may also store graphical models of one or more buildings managed by the management system 100. For example, the graphical models may include layouts and schematics of one or more rooms, floors, and buildings managed by the management system 100.

In these illustrative embodiments, objects in the management system 100 include anything that creates, processes or stores information regarding data points or otherwise serves as a software proxy for a data point, such as analog, binary, or multistate inputs and outputs of physical devices (e.g., controllers, field panels, sensors, actuators, valves, power switches, cameras, etc.). For example, one or more of the devices 116-120 may be associated with one or more objects. One or more of the objects may have properties that are based on a data point of a device in the devices 116-120. Objects may also include data files, such as, control schedules, calendars, trend reports, and the like.

In various embodiments, the database 124 includes hierarchy definitions that identify relationships between objects in the system. For example, a hierarchy may include a folder for "floor" in a building with multiple child folders in the form of "rooms". Each "room" folder, in turn, may have several child objects, such as "ventilation damper", "smoke detector", and "temperature sensor". Such hierarchy definitions among objects are conventional in nature and may take many forms. It will be appreciated that the use of hierarchical files in the management system 100 allows for technicians to define nearly any desirable hierarchy, the result of which is stored as a defined hierarchical file. The database 124 stores files identifying different versions of hierarchies between the objects of the system, including those representative of the devices 116-120.

The server data processing system 102 includes an object manager application to detect and manage objects in the management system 100. The object manager application is a software application that runs on the server data processing system 102. The object manager application includes functionality for searching for and discovering objects on the BLN 114 or objects on an FLN corresponding to points of field devices 116, 118 and 120 managed by a field panel or field controller in the conform system 108, security system 110 or safety system 112. For example, the server data processing system 102 may periodically search for objects and devices that are connected to the BLN 114. The object manager application also includes functionality for organizing the discovered objects into hierarchies based on the location of the devices in the building or buildings managed by the management system 100. For example, the server data processing system 102 may generate and store one or more hierarchies in the database 124. The client data processing system 106a and web client data processing system 106b may present a building manager with a logical view of the objects according to the hierarchy as described herein.

The client manager application 122 may further include software extensions or services that provide operations of the management system 100. For example, the software extensions may include a print manager, a reporting subsystem, and a status propagation manager. For example, a reporting subsystem implemented on a workstation data processing system (e.g., server data processing system 102, installed client data processing system 122a, and web client data processing system 122b) is a system that manages the acquisition of data values from the database 124 for the generation of various reports. Such reports may include, for example, trends for a temperature of a room or the like. In another example, the status propagation manager implemented on a workstation data processing system (e.g., server data processing system 102, installed client data processing system 106a, or web client data processing system 106b) propagates alarm status information, among other things, to various other data objects in the system. An example of a suitable alarm propagation system is provided in U.S. patent application Ser. No. 12/566,891, filed Sep. 25, 2009, which is assigned to the assignee of the present invention and is incorporated by reference herein.

In various embodiments, client manager application 122 may, via server data processing system 102, installed client data processing system 106a, or web client data processing system 106b, implement scheduling functions of the management system 100. The scheduling function is used to control points in the various systems based on a time-based schedule. For example, the scheduling function may be used to command temperature set points based on the time of day and the day of the week within the building automation devices 116.

The server data processing system 102 is connected to the BLN 114 and includes one or more hardware and/or software interfaces for sending and receiving information to and from the devices 116-120 in the comfort system 108, the security system 110, and/or the safety system 112. For example, the server data processing system 102 may request and receive data regarding a status of one or more devices in the devices 116-120. The client manager application 122, via server data processing system 102, installed client data processing system 106a, or web client data processing system 106b provides a user with the functionality to monitor real-time information about the status of one or more devices and objects in the management system 100. The client manager application 122, via server data processing system 102, installed client data processing system 106a or web client data processing system 106b, also provides a user with the functionality to issue commands to control one or more devices and objects in the management system 100. For example, one or more of the devices 116-120 may operate on a network protocol for exchanging information within the management system, such as BACnet or LonTalk.

Additional descriptions and examples of the management system 100 and components that may be present within the management system 100 may be found in Patent Cooperation Treaty Application Serial No. PCT/US2011/054141, filed Sep. 30, 2011, entitled "MANAGEMENT SYSTEM WITH VERSATILE DISPLAY" and U.S. Provisional Patent Application Ser. No. 61/541,925, filed Sep. 30, 2011, entitled "MANAGEMENT SYSTEM USING FUNCTION ABSTRACTION FOR OUTPUT GENERATION".

The illustration of the management system 100 in FIG. 1 is not meant to imply physical or architectural limitations to the manner in which different illustrative embodiments may be implemented. Other components in addition to and/or in place of the ones illustrated may be used. Some components may be unnecessary in some illustrative embodiments. For example, any number of data processing systems may be used as workstations in the management system 100, while functions of the client manager application 122 may be implemented in different data processing systems in the management system 100. In other examples, embodiments of the management system 100 may not include one or more of the comfort system 108, the security system 110, and/or the safety system 112.

Figure 2:
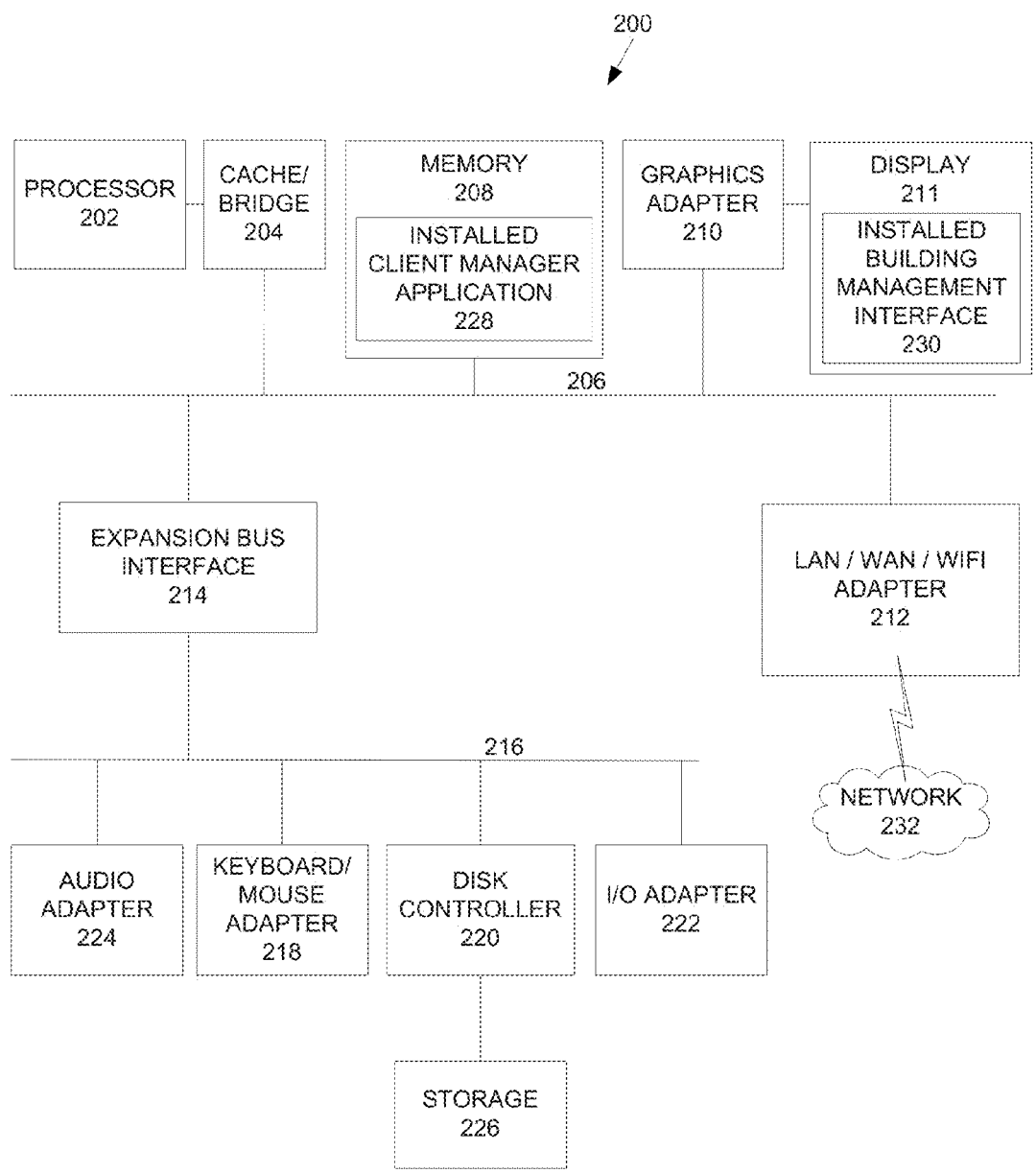
FIG. 2 illustrates a block diagram of a data processing system that may be employed in the management system in FIG. 1 to implement an installed client data processing system consistent with disclosed embodiments of the present invention.

FIG. 2 depicts a block diagram of a data processing system 200 in which various embodiments are implemented. The data processing system 200 is an example of one implementation of the installed client data processing system 106a in FIG. 1.

The installed data processing system 200 includes a processor 202 connected to a level two cache/bridge 204, which is connected in turn to a local system bus 206. The local system bus 206 may be, for example, a peripheral component interconnect (PCI) architecture bus. Also connected to the local system bus 206 in the depicted example are a main memory 208 and a graphics adapter 210. The graphics adapter 210 may be connected to a display 211.

Other peripherals, such as a local area network (LAN)/Wide Area Network (WAN)/Wireless (e.g. WiFi) adapter 212, may also be connected to the local system bus 206. An expansion bus interface 214 connects the local system bus 206 to an input/output (I/O) bus 216. The I/O bus 216 is connected to a keyboard/mouse adapter 218, a disk controller 220, and an I/O adapter 222. The disk controller 220 may be connected to a storage 226, which may be any suitable machine-usable or machine-readable storage medium, including, but not limited to, nonvolatile, hard-coded type mediums, such as read only memories (ROMs) or erasable, electrically programmable read only memories (EEPROMs), magnetic tape storage, and user-recordable type mediums, such as floppy disks, hard disk drives, and compact disk read only memories (CD-ROMs) or digital versatile disks (DVDs), and other known optical, electrical, or magnetic storage devices.

Also connected to the I/O bus 216 in the example shown is an audio adapter 224, to which speakers (not shown) may be connected for playing sounds. The keyboard/mouse adapter 218 provides a connection for a pointing device (not shown), such as a mouse, trackball, trackpointer, etc. In some embodiments, the data processing system 200 may be implemented as a touch screen device, such as, for example, a tablet computer or a touch screen panel. In these embodiments, elements of the keyboard/mouse adapter 218 may be implemented in connection with the display 211.

In various embodiments of the present disclosure, the data processing system 200 is implemented as an installed workstation with portions of a client manager application 122 installed in the memory 208 as an installed client manager application 228. The installed client manager application 228 is an example of one embodiment of client manager application 122a in FIG. 1. For example, the processor 202 executes program code of the installed client manager application 228 to generate installed building management interface 230 displayed on display 211. In various embodiments of the present disclosure, the installed building management interface 230 includes a display of one or more floors or rooms of one or more buildings managed by the management system 100 in FIG. 1. The installed building management interface 230 provides an interface for a user to view information about and control one or more devices, objects, and/or points monitored by the management system 100. The installed building management interface 230 also provides an interface that is customizable to present the information and the controls in an intuitive and user-modifiable manner.

Those of ordinary skill in the art will appreciate that the hardware depicted in FIG. 2 may vary for particular implementations. For example, other peripheral devices, such as an optical disk drive and the like, also may be used in addition to or in place of the hardware depicted. The depicted example is provided for the purpose of explanation only and is not meant to imply architectural limitations with respect to the present disclosure.

One of various commercial operating systems, such as a version of Microsoft Windows™, a product of Microsoft Corporation located in Redmond, Wash., may be employed if suitably modified. The operating system may be modified or created in accordance with the present disclosure as described, for example, to implement discovery of objects and generation of hierarchies for the discovered objects.

The LAN/WAN/Wifi adapter 212 may be connected to a network 232, such as, for example, MLN 104 in FIG. 1. As further explained below, the network 232 may be any public or private data processing system network or combination of networks known to those of skill in the art, including the Internet. Data processing system 200 may communicate over network 232 to one or more computers, which are also not part of the data processing system 200, but may be implemented, for example, as a separate data processing system 200.

Figure 3:
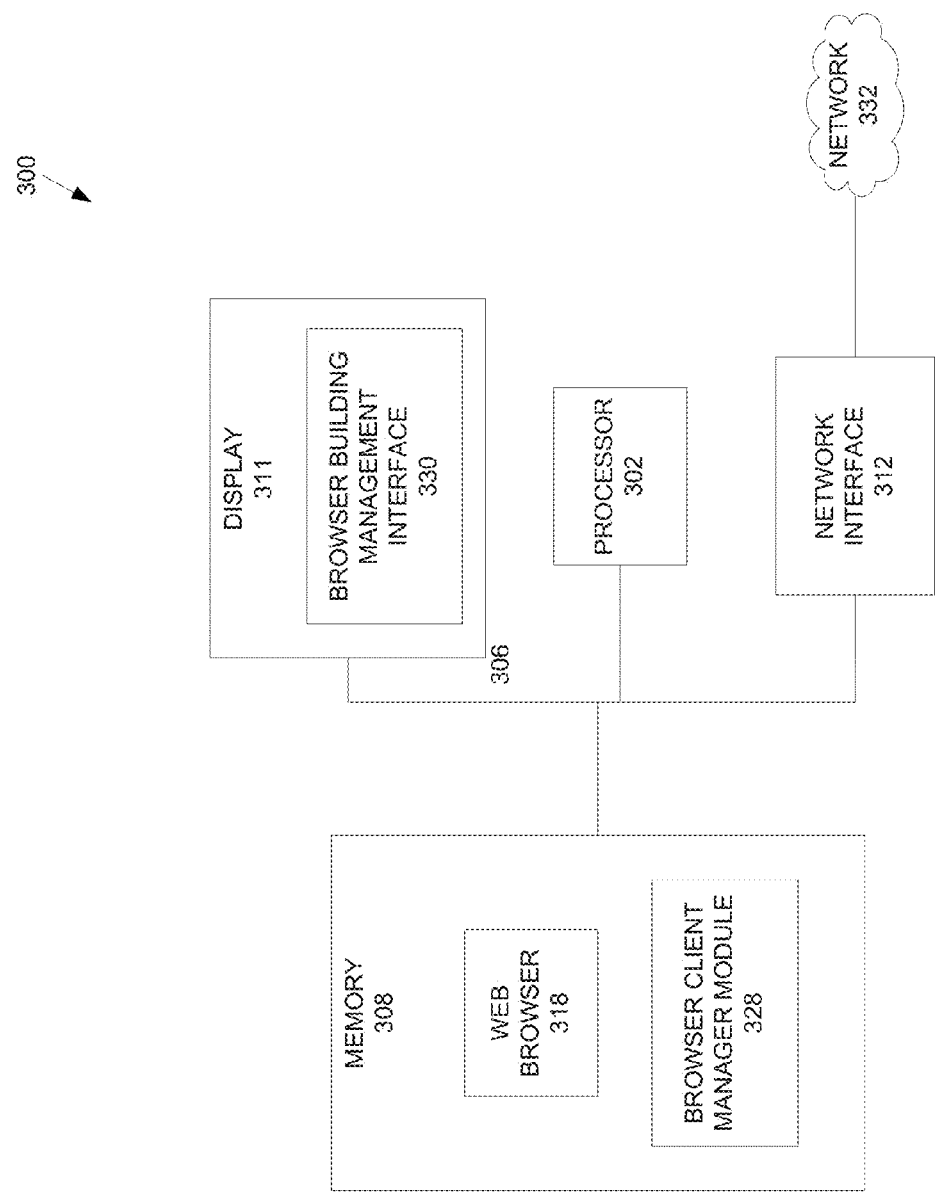
FIG. 3 illustrates a block diagram of a data processing system that may be employed in the management system in FIG. 1 to implement a web client data processing system consistent with disclosed embodiments of the present invention.

FIG. 3 depicts a block diagram of a data processing system 300 in which various embodiments are implemented. The data processing system 300 is an example of one implementation of the web client data processing system 106b in FIG. 1.

The data processing system 300 of FIG. 3 includes a processor 302 which is connected to a local system bus 306. The local system bus 306 may be, for example, a peripheral component interconnect (PCI) architecture bus. Also connected to local system bus in the depicted example are a main memory 308, a display 311 and a network interface 312

In various embodiments of the present disclosure, the data processing system 300 is implemented as a remote workstation with web browser 318 installed in memory 308 and browser client manager module 328 downloaded from server data processing system 102 and temporarily stored in memory 308 upon request by the web client data processing system 300. The browser client manager module 328 is an example of one embodiment of browser client manager module 122b in FIG. 1. For example, the processor 302 executes program code of the browser client manager module 328 to generate browser building management interface 330 displayed on display 311. The browser building management interface 330 has substantially the same appearance and functionality as the installed building management interface 230 that is provided by running the installed client manager application 228 in data processing system 200 discussed above.

Those of ordinary skill in the art will appreciate that the hardware depicted in FIG. 3 may vary for particular implementations. The depicted example is provided for the purpose of explanation only and is not meant to imply architectural limitations with respect to the present disclosure.

Network Interface 312 may be connected to a network 332, such as for example, MLN 104 in FIG. 1. The network 332 may be any public or private data processing system network or combination of networks, as known to those of skill in the art, including the Internet. Data processing system 300 may communicate over network 332 to one or more computers, which are also not part of data processing system 300, but may be implemented, for example, as a separate data processing system 300.

Figure 4:
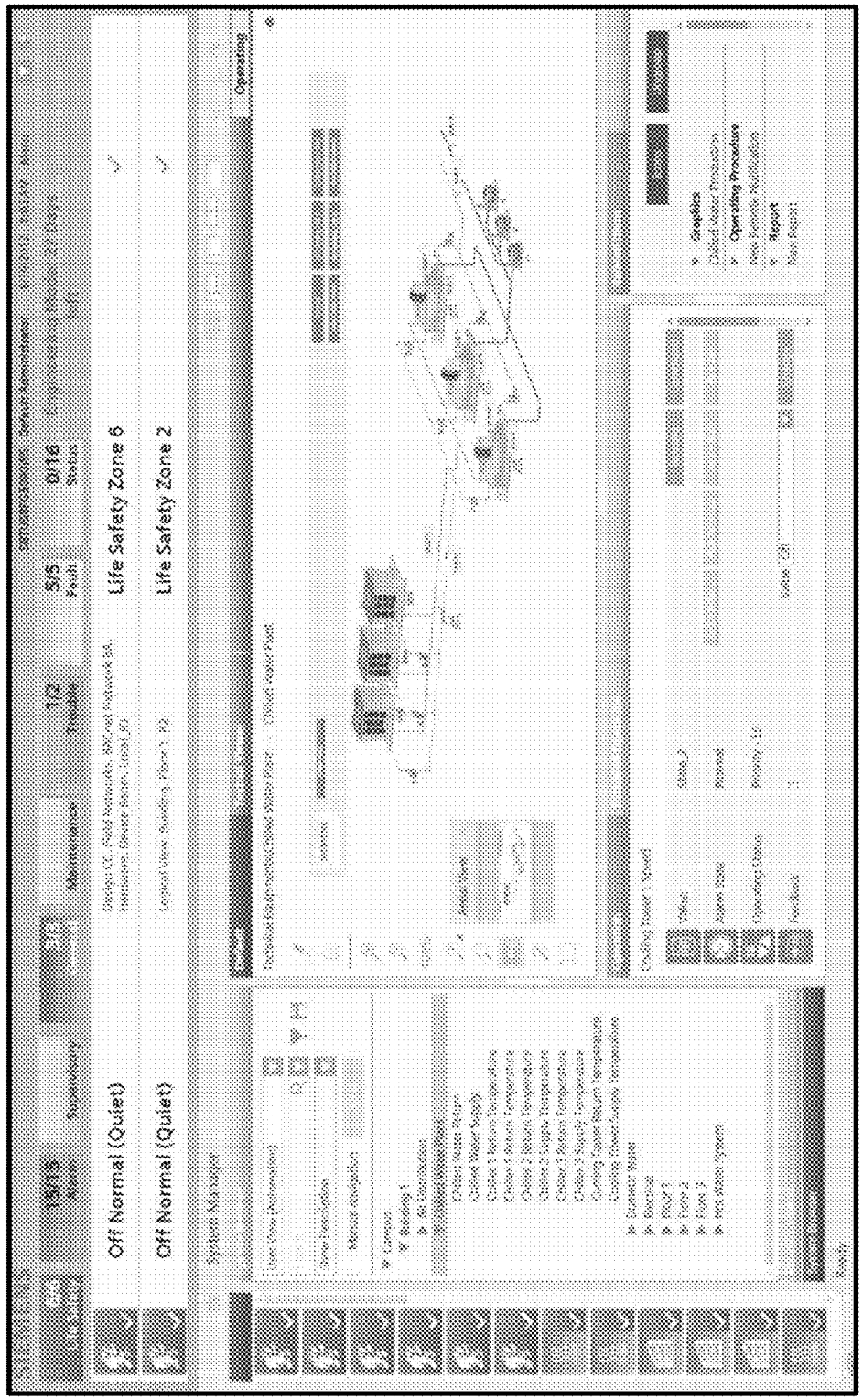
FIG. 4 shows a screen capture of an exemplary screen display of an installed building management interface generated in the installed client data processing system in FIG. 2, where the installed building management interface is populated by data for a specific building system.
Figure 5:
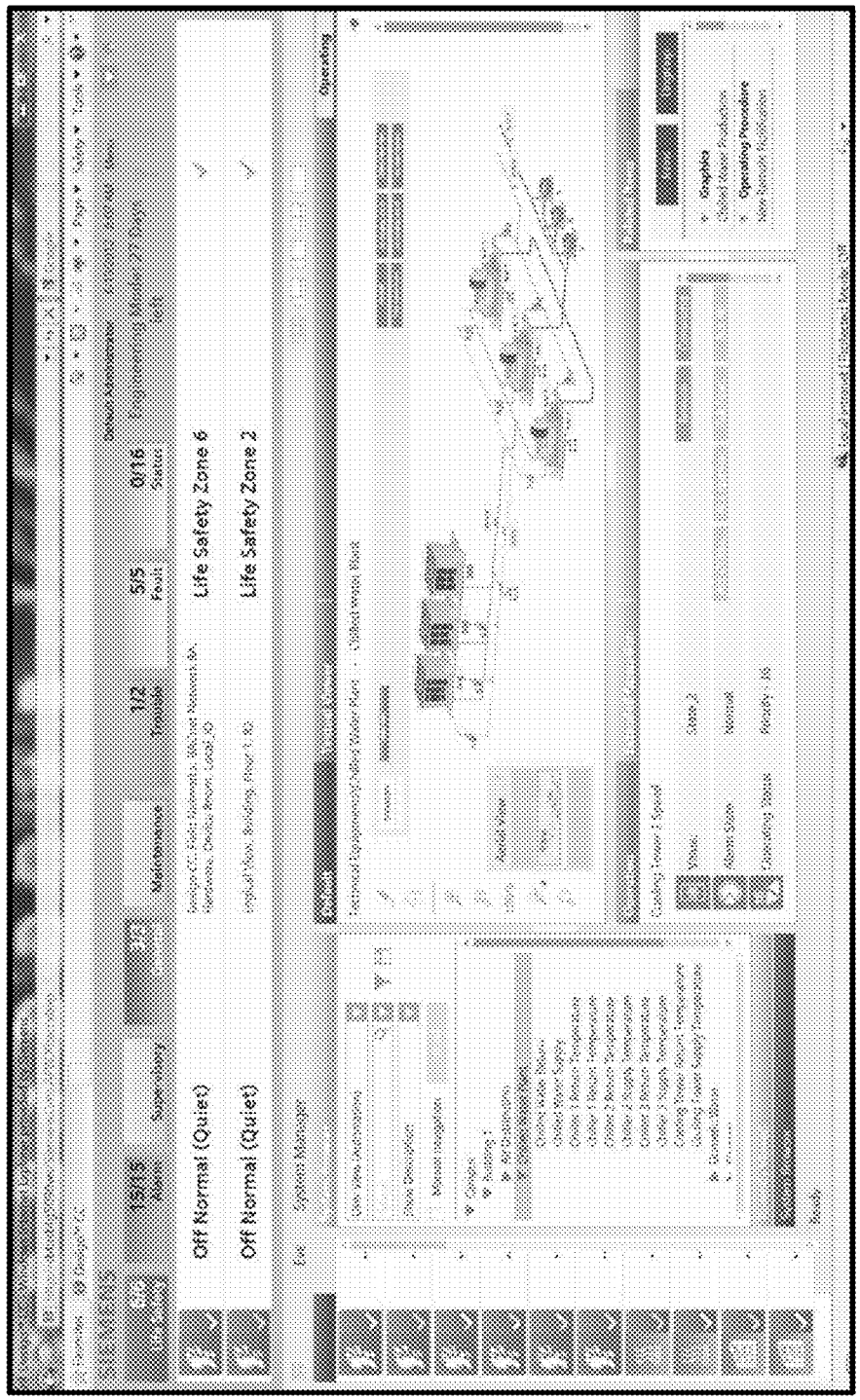
FIG. 5 shows a screen capture of an exemplary screen display of a browser building management interface generated in the web client data processing system in FIG. 3, where the browser building management interface is populated by the same data for a specific building system that is displayed by the installed building management interface as illustrated in FIG. 4.

Referring to FIG. 4, there is shown a screen capture of an exemplary screen display of the installed building management interface 230 in FIG. 2 generated in an installed client data processing system 106a populated by data for a specific building system. Reference is also made to FIG. 5, which shows a screen capture of an exemplary screen display of the browser building management interface 330 in FIG. 3 generated in a web client data processing system 106b populated by the same data for the specific building system that appears in FIG. 4. A comparison of graphical user interfaces 230 and 330 shows that they have substantially the same appearance and functionality.

Figure 6:
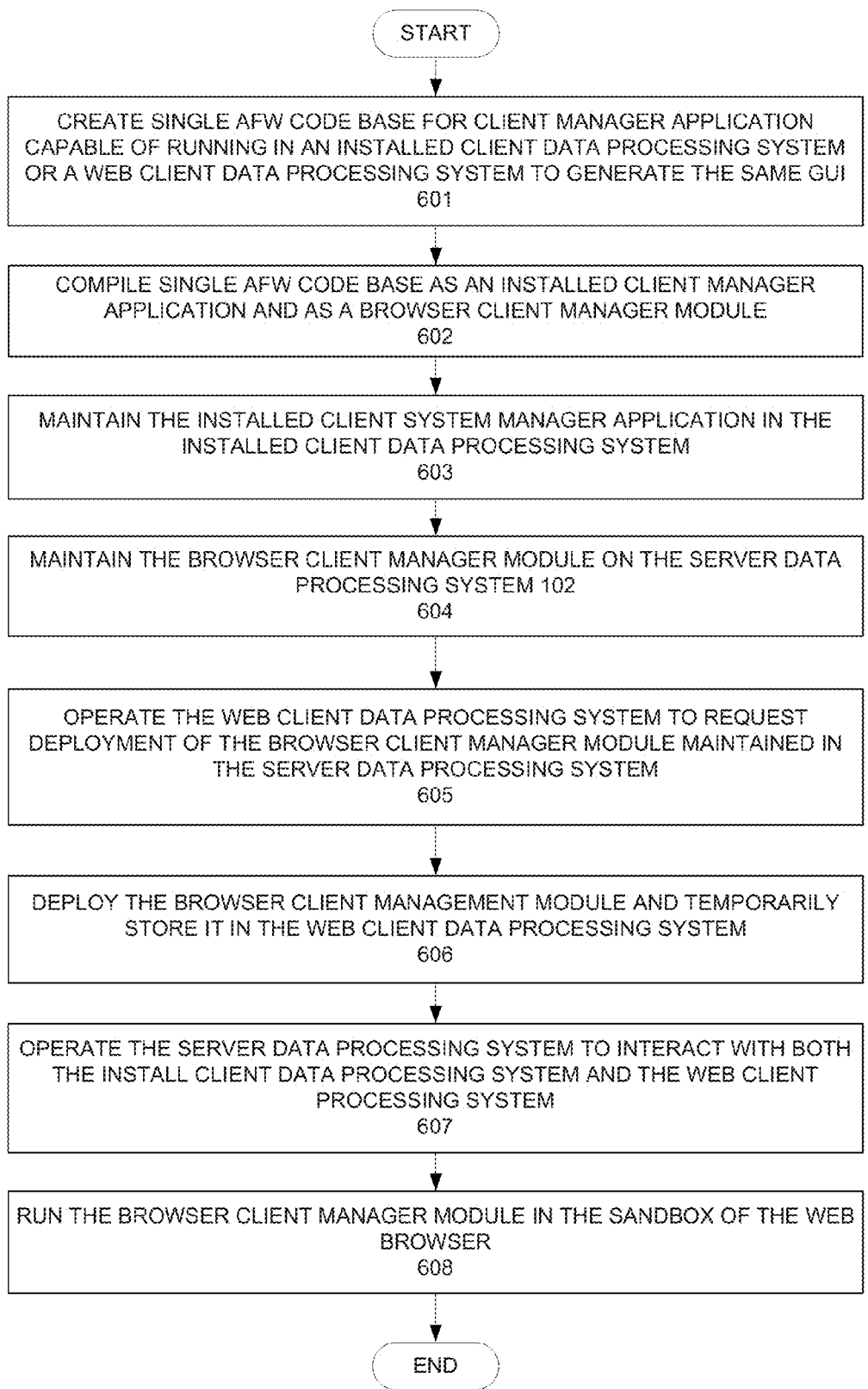
FIG. 6 illustrates a flowchart of a process for providing a user interface for the management system in FIG. 1 having substantially the same appearance and functionality regardless of whether it is generated by a client manager application or a browser client manager module in accordance with disclosed embodiments of the present invention.

FIG. 6 depicts a flowchart of a process for generating a user interface for management system 100 that has substantially the same appearance and functionality when browser client manager module 122b is run in web client data processing system 106b as when installed client manager application 122a is run in installed client data processing system 106a in accordance with disclosed embodiments. The process may be implemented by executable instructions stored in a non-transitory computer-readable medium that cause one or more data processing systems to perform such a process. For example, the client manager application 122 may comprise the executable instructions to cause one or more data processing systems to perform such a process.

The process begins with creating a single AFW code base for the client manager application 122, hosting application parts, that runs either as an installed client manager application 122a or as a browser client manager module 122b (step 601). For example, the AFW code base may be developed using Windows Presentation Foundation ("WPF") released by Microsoft Corporation located in Redmond, Wash. with .NET Framework 3.0 (and higher).

Disclosed embodiments can use very similar applications both on a Windows platform and a web platform, sharing the majority of the code base. This avoids having to implement a separate solution for the browser client manager module that is different from the solution for the installed client manager application. The cost and effort to implement and maintain the installed client manager application and browser client manager module is significantly reduced because there is only one code base to write and debug.

The AFW code base is configured to provide a user interface having substantially the same appearance and functionality regardless of whether it is run as an installed client manager application or run as a browser client manager module. For example, the same information displayed within multiple windows of the installed building management interface provided by the client system management application 122a is displayed within multiple panes of a single window of the browser building management interface provided by the browser client manager module 122b. The AFW reads a "layout definition file" and arranges windows and panes within windows according to the environment in which portions of the client manager application is run. As a result, users are presented with a graphical user interface having substantially the same appearance and functionality regardless of the environment in which portions of the client manager application is run.

The single AFW code base for the client manager application is compiled as both an installed client manager application and as a browser client manager module (step 602). The client manager application may be a .NET application built on the .NET Framework version 3.5 or higher using Extensible Application Markup Language (XAML). The browser client manager module may be a XAML Browser Application (XBAP) capable of running in the sandbox or isolated space of a web browser such as Internet Explorer in partial trust mode, which restricts access to the local computer resources. Note that this compilation step may be performed only occasionally and is not essential to be performed each time the process is performed.

Referring to FIG. 4, it demonstrates that when the installed client manager application is run, it cooperates with the server data processing system to create a screen display that may include a first window having a selection area, also referred to as a system browser, a primary work area, a contextual work area, and a related items area; a second window having an alarm notification area; and a third window having an event list, as described in greater detail in U.S. Provisional Patent Application Ser. No. 61/541,925, filed Sep. 30, 2011, entitled "MANAGEMENT SYSTEM USING FUNCTION ABSTRACTION FOR OUTPUT GENERATION." Referring to FIG. 5, it demonstrates that when the browser client manager module is run, it cooperates with the server data processing system to create a screen display that has substantially the same appearance and functionality as the screen display created by operation of the installed client manager application with respect to the same point data. In this example, the browser client manager module creates a screen display that has a window with a first pane having a selection area, a primary work area, a contextual work area, and a related items area; a second pane having an alarm notification area; and a third pane having an event list.

The installed client manager application 122a, for example compiled as an XAML application, is maintained in the installed client data processing system 106a (step 603).

The browser client manager module, for example compiled as an XBAP module 122b, is maintained on the server data processing system 102 (step 604).

The web client data processing system 106b requests deployment over network 104 of the browser client manager module 122b stored on the server data processing system 102 (step 605).

The browser client manager module 122b is deployed from the server data processing system 102 and temporarily stored in the memory of the web client data processing system 106b (step 606).

The server data processing system 102 interacts with both the installed client data processing system 106a and the web client data processing system 106b to perform building management system functions (step 607).

The browser client manager module 122b is run in a sandbox of the web browser in the web client data processing system 106b (step 608) to create a browser building management interface having substantially the same appearance and functionality as an installed building management interface created by running the installed client manager application 122a in the installed client data processing system 106a (step 608).

The installed client manager application may be configured to permit an installed client data processing system 106a to operate in either a closed mode or in a semi-open mode. In the closed mode, the installed client data processing system is dedicated to the management system 100. Only applications, other than the installed client manager application, that are configured as authorized can be launched. For example, if a user decides to allow use of Microsoft Word or Excel, the installed client manager application is configured to allow access to the authorized applications only via a menu within the installed building management interface provided by the installed client manager application. In addition, an authorized application can only be launched in one preselected window generated by the installed client manager application and cannot be moved to cover other windows.

In the semi-open mode, the installed client data processing system is only partially dedicated to the management system 100. A user can open other applications while the installed client manager application is open, however, no window in which an such other application is opened can be moved to cover one or more preselected windows generated by the installed client manager application that contain high priority information such as alarm icons or alarm summaries.

Those skilled in the art will recognize that, for simplicity and clarity, the full structure and operation of all data processing systems suitable for use with the present disclosure are not being depicted or described herein. Instead, only so much of a management system as is unique to the present disclosure or necessary for an understanding of the present disclosure is depicted and described. The remainder of the construction and operation of management system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for generating a graphical user interface for a building management system comprising the steps of:
    maintaining in a server data processing system a client manager application configured to interact with both a web client data processing system and an installed client data processing system to perform building management system functions, the installed client data processing system operating an installed client manager application to provide an installed building management interface;
    deploying a browser client manager module to the web client data processing system over a network in response to a request from the web client data processing system, the browser client manager module configured to interact with a web browser on the web client data processing system to provide a browser building management interface that has substantially the same appearance and functionality as the installed building management interface;
    operating the server data processing system to interact with both the installed client data processing system and the web client data processing system to perform the building management system functions; and
    wherein the installed client manager application and the browser client manager module are created using a common code base.

2. The method of claim 1 further comprising the step of displaying information within one or more windows of the installed building management interface generated by the installed client manager application and displaying the same information within one or more panes of a single window of the browser building management interface.

3. The method of claim 1 further comprising the step of displaying information within multiple windows and panes of the installed building management interface generated by the installed client manager application and displaying the same information within multiple panes of a single window of the browser building management interface.

4. The method of claim 3, wherein the multiple panes of a single window of the browser building management interface comprises a first pane having a selection area, a primary work area, a contextual work area, and a related items area; a second pane having an alarm notification area; and a third pane having an event list.

5. The method of claim 3, wherein the client manager application is configured to prevent the installed client data processing system from launching other applications which are not authorized and is configured to require the installed client data processing system to launch authorized applications only within a preselected window of the installed building management interface.

6. The method of claim 3, wherein the client manager application is configured to prevent other applications launched by the installed client data processing system from covering one or more preselected windows of the installed building management interface.

7. A method for generating a graphical user interface for a building management system comprising the steps of:
sending a request from a web browser to a server data processing system to deploy a browser client manager module configured to run in a web client data processing system;
downloading the browser client manager module to the web client data processing system; and
running the browser client manager module in a sandbox of the web browser on the web client data processing system to create a browser building management interface having substantially the same appearance and functionality as an installed building management interface created by running a client manager application in an installed client data processing system, the browser client manager module and the client manager application having been created using a single application framework code base.

8. The method of claim 7, further comprising the step of displaying information within one or more windows of the installed building management interface and displaying the same information within one or more panes of a single window of the browser building management interface.

9. The method of claim 7, further comprising the step of displaying information within multiple windows of the installed building management interface and displaying the same information within multiple panes of a single window of the browser building management interface.

10. The method of claim 9 wherein the multiple panes of a single window of the browser building management interface comprises a first pane having a selection area, a primary work area, a contextual work area, and a related items area; a second pane having an alarm notification area; and a third pane having an event list.

11. A non-transitory computer-readable medium encoded with executable instructions for a building management system that:
is configured to run in a web client data processing system as well as in an installed client data processing system;
is created using a single application framework code base;
when executed in an installed client data processing system creates a graphical user interface for the building management system; and
when executed in a web client data processing system creates a graphical user interface for the building management system having substantially the same appearance and functionality as the graphical user interface created when executed in the installed client data processing system.

12. A server data processing system, comprising:
a storage device comprising a client manager application;
an accessible memory comprising instructions of the client manager application; and
a processor configured to execute the instructions of the client manager application to:
maintain a client manager application configured to interact with both a web client data processing system and an installed client data processing system to perform building management system functions, the installed client data processing system operating an installed client manager application to provide an installed building management interface;
deploy a browser client manager module to the web client data processing system over a network in response to a request from the web client data processing system, the browser client manager module configured to interact with a web browser on the web client data processing system to provide a browser building management interface that has substantially the same appearance and functionality as the installed building management interface; and
interact with both the installed client data processing system and the web client data processing system to perform the building management system functions.

13. The server data processing system of claim 12, wherein information is displayed within one or more windows of the installed building management interface generated by the installed client manager application and the same information is displayed within one or more panes of a single window of the browser building management interface.

14. The server data processing system of claim 12, wherein information is displayed within multiple windows and panes of the installed building management interface generated by the installed client manager application and the same information is displayed within multiple panes of a single window of the browser building management interface.

15. The server data processing system of claim 14, wherein the client manager application is configured to prevent the installed client data processing system from launching other applications which are not authorized and is configured to require the installed client data processing system to launch authorized applications only within a preselected window of the installed building management interface.

16. The server data processing system of claim 14, wherein the client manager application is configured to prevent other applications launched by the installed client data processing system from covering one or more preselected windows of the installed building management interface.

17. The server data processing system of claim 14, wherein the installed client manager application and the browser client manager module are created using a common code base.

* * * * *